Feb. 17, 1925.

H. C. FORD

RANGE FINDER

Filed Dec. 1, 1915

Feb. 17, 1925.
H. C. FORD
RANGE FINDER
Filed Dec. 1, 1915
1,526,538
4 Sheets-Sheet 2
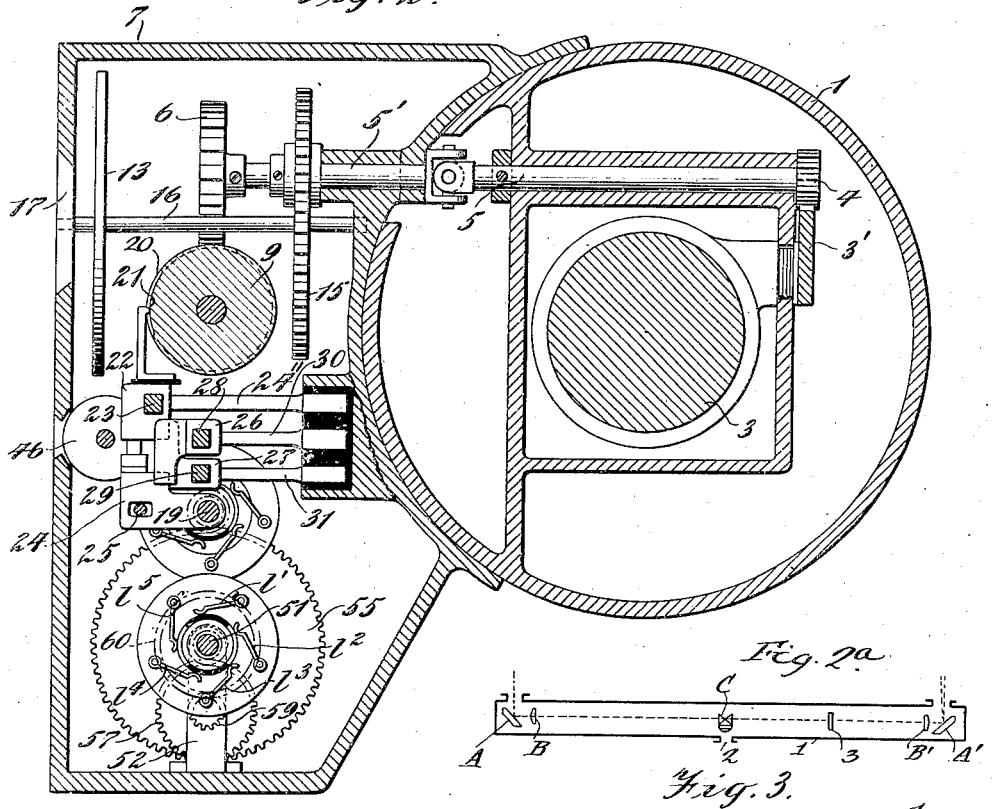

Feb. 17, 1925.

H. C. FORD

RANGE FINDER

Filed Dec. 1, 1915      4 Sheets-Sheet 3

1,526,538

Witnesses:

Inventor
Hannibal C. Ford
By his Attorneys
Rosenbaum, Stockbridge & Borst

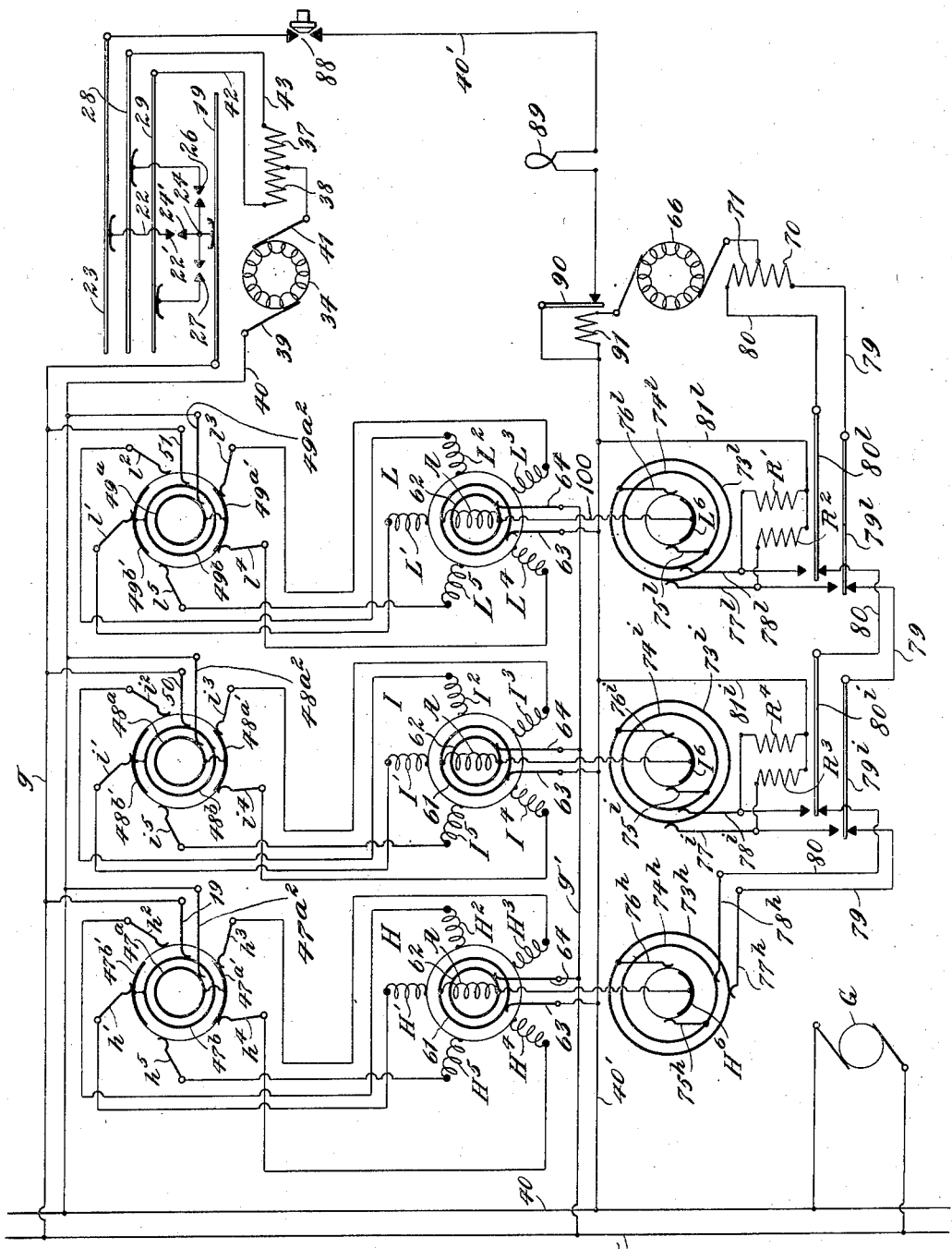

Patented Feb. 17, 1925.

1,526,538

UNITED STATES PATENT OFFICE.

HANNIBAL C. FORD, OF NEW YORK, N. Y., ASSIGNOR, BY MESNE ASSIGNMENTS, TO FORD INSTRUMENT COMPANY, INC., A CORPORATION OF NEW YORK.

RANGE FINDER.

Application filed December 1, 1915. Serial No. 64,428.

*To all whom it may concern:*

Be it known that I, HANNIBAL C. FORD, a citizen of the United States, residing at the city of New York, in the borough of Queens and State of New York, have invented certain new and useful Improvements in Range Finders, of which the following is a full, clear, and exact description.

My invention relates to range finders of the character used on war vessels or in fortifications for determining the range or distance from the point of observation of a hostile vessel, fortification or other target in order to ascertain the correct aim or bearing of the guns to hit the target, and relates particularly to systems for transmitting the readings of the range finding instrument to an indicator at a distant point, as a receiving station from which an observer may communicate the proper elevation of the guns to the gunners. In the class of range finders to which this invention relates, a ray of light is usually deflected, by the movement of a refracting prism or otherwise in order to displace a partial image of the target formed thereby with respect to a second partial image formed by a second ray of light. The amount of such displacement gives a measure of the angle formed by the two light rays, from which the range of the target may be computed or directly indicated on an appropriate scale when the length of the base subtended by such angle is known.

For a given base (B); i. e. the distance between the two reflecting prisms. The relation between the angle (A) formed by the two light rays and the range (R) may be expressed by the inverse ratio $R \alpha \; B/A$. In general, the values of the angle and hence the movement of the mechanism used in setting the range finder vary within wide limits throughout the scale relative to the distances or ranges measured by such settings. For example, a given small increment of range at the upper end of the scale, say at 20,000 yards distant from the point of observation, requires approximately only 1/10 of the extent of movement of the setting mechanism that would be necessary for the same increment of range in the neighborhood of 2,000 yards.

Systems have been heretofore proposed for indicating the movement of the angle measuring device at a distant point, and this has been done by transmitting the variable motion of the range finder handle to the distant point for driving a continuous scale carrying variably spaced graduations corresponding to the adjustment of the instrument to indicate given uniform increments of range throughout the scale.

Such systems, however, have certain marked disadvantages resulting from the necessity of using a variable scale. For example, the scale, not being repeating, must be a single continuous scale, and as the graduations at the upper end of the scale are relatively very small, the scale must be inconveniently long in order to be legible at the upper end, and consequently an instrument of considerable size must be used which requires a correspondingly large amount of power for operation.

Furthermore, when any step-by-step transmission system is employed with such a variably spaced scale, it is necessary to sacrifice either in the speed of transmission and indication at the lower end of the scale or in the refinement of transmission and indication at the upper end of the scale; or, in other words, when the individual steps of such transmission systems are so designed as to indicate sufficiently small increments of range at the upper end of the scale, such a transmission system will transmit unduly minute increments of range at the lower end of the scale, thereby greatly reducing the speed of transmission at this end. Step-by-step transmissions are also objectionable for such systems because of the necessity for repeatedly synchronizing the transmitting and receiving stations whenever they get out of step from any one of a number of causes.

An object of my invention is to obviate the difficulties and objections of the systems above referred to, and to provide a system in which the scale is uniform. Another object is to provide automatic means for keeping the actuating mechanism at the receiving station in step with the movement of the mechanism at the range finding station, or bringing it into step therewith if the latter gets ahead of the former. Another object is to provide means for selectively controlling the actuating mechanism at the receiving station according to a plurality of denominations or measurements of range.

Other objects are simplicity and compactness of construction, and reliability in operation. Still other objects and advantages of my invention will appear from the following description.

In accordance with my invention, I rectify the variable relation between the angular movement and the indicated range at the range finding station and transmit only such rectified motion which is directly proportional to the ranges indicated. More specifically, my invention comprehends an operating member at the range finding station which is operatively connected with the angle measuring device, the connection being such that the angle measuring device and operating member have differential motion, the movements of the operating member being in direct proportion to the corresponding ranges, while the displacements of the angle measuring device are out of direct proportion to the corresponding ranges. This operating member controls a plurality of step-by-step transmitting devices which selectively control the actuating mechanism at the receiving station. The actuating mechanism which is in the nature of a follow-up mechanism operates a suitable indicator. Since the graduations of the scale are uniform, the scale need not be continuous, but may be subdivided into a plurality of parts or sections having a multiple relation to each other, and these sections may take the form of rotative dials each provided with ten digits, 0 to 9, after the manner of the well known revolution counter. This distant control system is also adapted for operating other advantageous forms of indicators, such as recorders for graphically laying out distances directly proportional to the ranges transmitted.

My invention comprehends various other features of construction, and arrangements and combinations of parts, as will hereinafter more fully appear.

I shall now describe the embodiment of my invention illustrated in the accompanying drawings and shall thereafter point out my invention in claims.

Figure 1 is a front elevation, partly in section, of the operating and rectifying mechanism at the range-finding station, with the front of the casing removed;

Figure 2 is an irregular vertical section of the same on the line 2—2 of Figure 1, looking toward the left;

Figure 4:
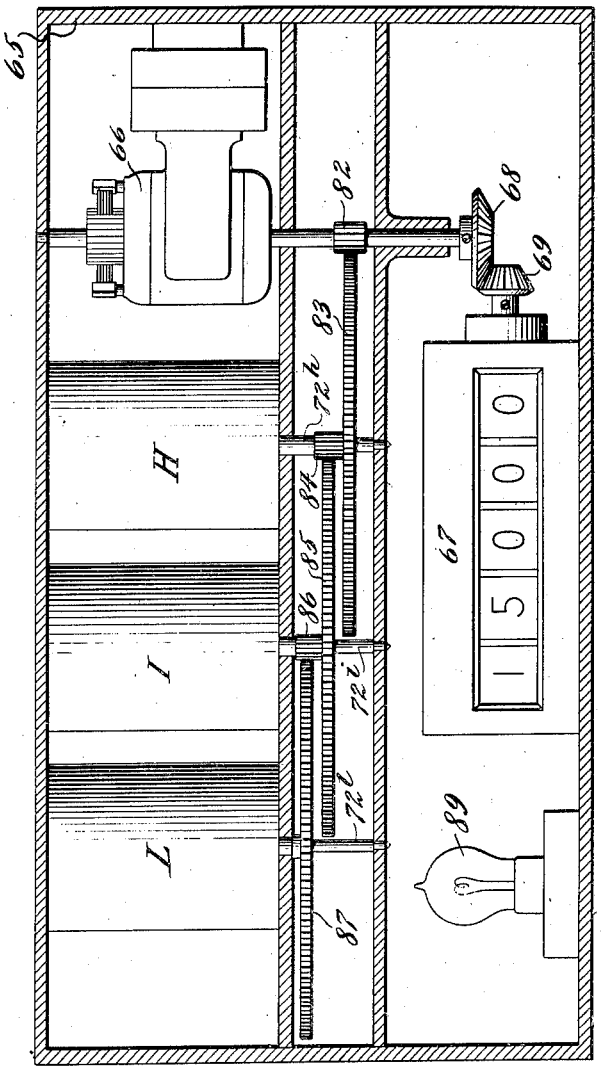
Figure 5:
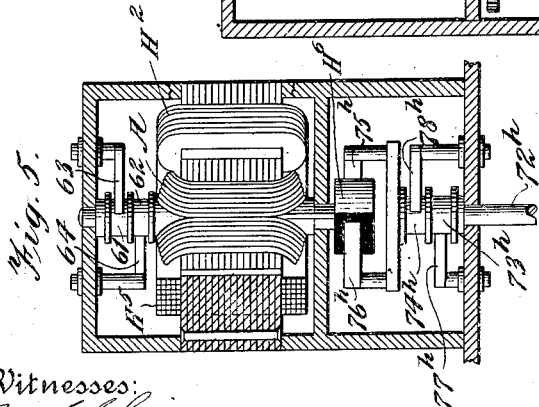
Figure 6:
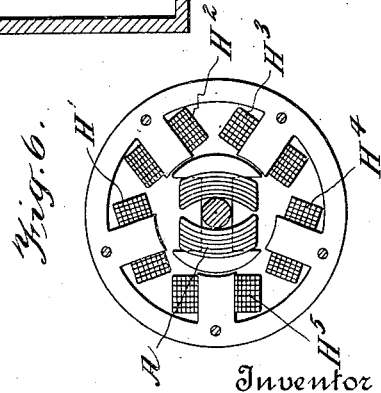

Figure 2ª is a diagram of the range finder;

Figure 3 is a view of the complete system, showing the apparatus at the two stations in elevation, and a diagram of the electrical connection between the two;

Figure 4 is an elevation of the apparatus at the receiving station, with the front of the casing removed;

Figure 5 is a central, enlarged vertical section of one of the selector step-by-step motors;

Figure 6 is a horizontal section of the same;

Figure 7 is a diagram of the electrical circuits.

The illustrated range finder 1 is of the well known coincidence type, of the construction shown in the patent to Barr and Straud No. 567,675, September 15, 1896, and diagrammatically illustrated in Figure 2ª. It employs two light ray reflecting prisms A A' located at opposite ends of the tube and transmitting the beams of light from the object viewed through objectives B B' toward the eye-piece C, whereby two partial images of the object are viewed by the observer through the opening 2. A refracting prism 3 is mounted for translatory movement along one of the light rays, and this translatory movement serves to displace the partial image formed by this ray with respect to that formed by the other ray, the translatory movement being proportional to the angle formed at the target by the two rays. In determining the range, the refracting prism is moved until the two partial images are brought into coincidence; and the range is then determined from the position of the mechanism used to adjust the refracting prism.

In the illustrated embodiment, the adjustable prism 3 (see Fig. 2) is adjusted by means of a rack 3' which is engaged by a pinion 4 on the outer end of the shaft 5, connected by a universal joint to a shaft 5' on the inner end of which is a worm-gear 6, which is operated by the operating mechanism contained in the casing 7, this casing fitting upon and being attached to the cylindrical casing of the range finder 1, in the manner shown in Figs. 2 and 3. The worm-gear 6 cooperates with the worm 8 on one end of the drum 9, which drum is carried by a longitudinal shaft 10 bearing at its ends in the casing 7, and having an operating crank wheel 11 and handle 12 fixed upon the right end thereof which projects through the side wall of the casing 7. Rotation of the handle 12, therefore, serves to rotate the worm-gear 6 a corresponding angular distance, and to adjust the refracting prism 3 through a corresponding translatory movement. A rotative calibrated dial 13 is driven by the worm-gear 6 through a pinion 14 fixed on the shaft 5', which engages a gear wheel 15 on the transverse counter shaft 16, which bears in the front and rear walls of the casing 7, and has the dial 13 fixed upon it near its front end. The front wall of the casing 7 has a window 17 formed therein, through which a portion of the dial 13 is exposed, as shown in Fig. 3, and an arrow 18 on the front of the casing 7 serves to indicate the range.

The rotation of the drum 9 is transmitted to an operating rotative shaft 19 through rectifying means, whereby the shaft 19 instead of being rotated variable angular distances for uniform increments of range, as are the drum 9 and the worm-gear 6, is rotated uniform angular distances for uniform increments of range throughout the working portion of the scale. These rectifying means comprise two spirals, one on the drum 9 and the other on the operating member 19, which operate two followers arranged in joint control of the power device for rotating the operating member 19. The two spirals are so formed that the rotation of the drum for a distance corresponding to a given increment of range at any part of the scale will always cause the operating member 19 to be rotated a uniform angular distance to bring its follower into a predetermined position relative to the follower controlled by the spiral on the drum 9.

As shown, the spiral on the drum 9 is a variable cam groove 20 which is so formed that a pin 21, which engages in the spiral groove and is carried by a plate attached to a longitudinal slidable follower or traveling member 22, will always be moved the same longitudinal distance by the angular movement of the drum 9 for a distance corresponding to a given increment of range at any part of the scale.

At one end of the drum the turns of the groove are relatively close together to compensate for the relatively large angular movement of the angle-measuring device at short ranges, and the turns of the spiral are progressively farther apart along the drum to compensate for the decrease in the angular movement at longer ranges. In other words, the cam groove 20 is so formed mathematically that the axial movement or movement of translation of the traveler 22, which is imparted by the angular movement of the cam groove 20, is uniform for a given increment of range anywhere within the limits of the range finder. The traveler 22 slides upon and is guided by the squared rod 23 of bronze or other conductive material, which extends parallel to the drum 9 and is supported at its ends by insulated arms 24" secured to the rear wall of the casing 7.

The operating member 19 is a shaft of conductive material arranged below the rod 23 and parallel thereto and rotarily bearing in the end walls of the casing 7. This operating member has uniform screw threads formed upon it, which serve to propel a follower 24 mounted upon it, the follower 24 having screw threads engaging upon those of the member 19, and being held against rotation by sliding engagement with a longitudinal bar 25 provided with suitable supports (not shown) at its ends in the walls of the casing. The traveling member 22 and the follower 24 cooperate to control two slidable contacts 26 and 27 which are slidably mounted upon two squared conductive parallel longitudinal rods or shafts 28 and 29, respectively, supported at their ends on insulated arms 30 and 31 attached to the rear wall of the casing 7. These slidable contacts 26 and 27 are engaged by coiled springs 32 and 33 which surround their respective shafts and tend to hold the slidable contacts against the follower 24. The traveler 22 and the follower 24 are both of conductive material, the former being insulated from the plate carrying the pin 21, as shown in Figures 1 and 2.

The operating member 19 is driven by an auxiliary operating series motor 34 through the pinion 35 on the armature shaft, and the gear wheel 36 upon the member 19. The motor 34 is provided with two oppositely wound field coils 37 and 38, Fig. 7, and these are respectively connected to the insulated rods 28 and 29, and through them to slidable contacts 26 and 27, respectively. The arrangement of oppositely wound coils as above is well known and enables the motor to be operated in either direction of rotation by energizing the corresponding coil.

The generator G is connected to the field coils 37 and 38 in multiple, one terminal being connected to the brush 39 through the wire 40, and the other terminal being grounded, and the operating member or screw 19 being grounded, ground being indicated by the line $g$ in Figure 7. It therefore will be seen that if neither of the contact members 26 and 27 is in contact with the follower 24, neither of the field coils of the motor 34 will be energized and there will therefore be no movement of the armature. If the drum 9 be rotated to move the traveling member 22 to the right, the movement of the member 22 will push the slidable contact 26 along the rod 28 and contact 27 will be forced by the spring 33 to engage contact 24 to energize the field coil 38 through the member 19, follower 24, contact 27, rod 29 and wire 42. Similarly, if the drum 9 be rotated to move the traveler 22 toward the left, contact 26 will engage contact 24 to energize coil 37 through the operating member 19, follower 24, contact 26, rod 28, and wire 43. The energizing of the coil 37 will operate the motor 34 and rotate the operating screw 19 in the right direction to propel the follower 24 toward the right until it again breaks contact with the contact member 27, the contact member 26 being in the meantime held against the follower 24 by the spring 33. Similarly, the energizing of the coil 38 will cause the operating screw 19 to be rotated in the right direction to propel the follower 24 toward the left until it again breaks contact with the contact member 26.

It will be noted that since the traveler 22 is always propelled the same distance for a given increment of range, the follower 24 will also be propelled the same uniform distance for the same given increment of range, and that the operating member 19 is always, therefore, rotated the same angular distance to propel the follower 24 through the uniform movement to restore its predetermined position relative to the traveler 22, and thus stop the motor 34. It is immaterial how far ahead of the follower 24 the traveling member 22 may be adjusted, since the motor 34 will continue to operate until the parts are brought back to their proper relative position, and the operating member 19 will therefore be driven the proper angular distance corresponding to the adjustment of the angle-measuring device.

It is manifest that the invention is only limited by the requirement that uniform rotations of the operating member 19 serve to adjust the follower 24 the same distance as the traveler 22 is adjusted for corresponding increments of range. With the arrangement shown, the traveler 22, being uniformly driven, may serve as an indicator, and for that purpose might readily co-operate with a linear scale having uniform graduations. It is also manifest that the invention is not limited to the illustrated operative connection between the members 9 and 19, the essential requirement being that the connection be such as to properly relate the displacement of the angle measuring device and that of the operating member 19. For an example of other connections, reference is made to my United States Patent No. 1,317,914 issued October 7, 1919.

As shown in Figure 1, the spiral groove on the drum 9 may be continued beyond the upper end of the working scale by a number of closely spaced turns formed without any relation to the range, but which will enable the operator to give the drum several turns after the upper end of the working scale has been reached, in order to test the device at infinity position without the followers exceeding the length of the spiral on the operating member 19, which obviously could not be extended to infinity.

The operating member 19 may be used to operate an indicator at the range-finding station, or may be used to transmit the rectified motion to a distant point, or in fact, as shown in the illustrated embodiment, it may be used for both purposes. A gear wheel 44 on the operating member 19 meshes with a pinion 45 on the revolution counter 46, which is exposed through a window in the front of the casing, as shown in Figures 2 and 3. The range finder, as illustrated, has been adjusted to 15,000 yards, and this range is indicated both on the variably driven dial 13 and by the uniformly actuated indicator 46 at the range-finding station.

The means for transmitting the rectified angular motion of the operating member 19 to the indicator at the receiving station comprises, in the illustrated embodiment, three electrical contact devices operated by the operating member 19 and selectively controlling three step-by-step selector motors arranged in selective control of the actuating motor for the indicator. The three contact devices are of similar construction and comprise three pairs of oppositely polarized slip rings $47^a$ and $47^b$, $48^a$ and $48^b$, and $49^a$ and $49^b$, respectively. These contact devices are mounted upon the operating member 19, upon a rotative shaft 50 and upon a rotative shaft 51, respectively, the two latter shafts being arranged in alinement underneath and parallel to the operating member 19. The shaft 50 bears at one end in the side wall of the casing 7, being thus grounded, its other end bearing in an upstanding arm 52 attached to the bottom of the casing; and the shaft 51 bears at its opposite ends in the upstanding arm 52 and in a similar upstanding arm 53. The slip rings of each pair are insulated from each other and have a segmental lateral extension, the contact segments of each pair overlapping in the same transverse plane and being substantially diametrically opposed to each other, the respective contact segments being indicated by the characters $47^{a\prime}$ and $47^{b\prime}$, $48^{a\prime}$ and $48^{b\prime}$, and $49^{a\prime}$ and $49^{b\prime}$. The slip rings $47^a$, $48^a$, $49^a$, and their respective contact segments, are polarized by brushes $47^{a2}$, $48^{a2}$ and $49^{a2}$, respectively, which are connected in multiple to the conductor 40, and the slip rings $47^b$, $48^b$ and $49^b$ and their respective segments are grounded by contact with their respective shafts. This is indicated in the diagram of Figure 7 by connecting the brushes 49, 50 and 51 which lead from the respective slip rings to ground wire $g$.

The contact segments on the operating member 19 are rotated at the speed of the operating member, being carried by it, while the contact segments on the shaft 50 are driven at one-tenth of the speed of the first pair, through the pinion 54 on the operating member 19 and gear wheel 55 on the shaft 50, which meshes with the pinion 54; and the contact segments on the shaft 51 are driven at one-tenth of those on the shaft 50, through the pinion 56 on the shaft 50, gear wheel 57 on the counter shaft 58, pinion 59 on the shaft 58 and gear wheel 60 on the shaft 51.

Co-operating with each pair of contacts of each contact device is a set of five brushes, those of the high speed contact device being marked respectively, $h^1$, $h^2$, $h^3$, $h^4$ and $h^5$; those of the intermediate contact device being marked respectively, $i^1$, $i^2$, $i^3$, $i^4$ and $i^5$, and those of the third or low speed contact device on the shaft 51 being marked respectively $l^1$, $l^2$, $l^3$, $l^4$ and $l^5$. The brushes of each set are arranged circumferentially around their respective contact segments so as to successively engage the respective segments, and they are so spaced that not more than two brushes can engage one segment at a time, and so that when one segment is engaged by two brushes the complementary segment can only be engaged by the one brush directly opposite the first two, as shown in the diagram of Figure 7.

The brushes of each set are connected to the five field coils of a step-by-step selector motor located at the receiving station, the three selector motors which are controlled by the high, intermediate and low speed contact devices being marked H, I and L, respectively, and the five field coils of the respective step-by-step motors being marked $H^1$, $H^2$, $H^3$, $H^4$ and $H^5$, and $I^1$, $I^2$, $I^3$, $I^4$ and $I^5$, and $L^1$, $L^2$, $L^3$, $L^4$ and $L^5$, in the order in which they are connected to the brushes similarly designated. The five field coils are connected in multiple, as in the usual step-by-step motor, and the armature winding A is connected to two slip rings 61 and 62 on the armature shaft, which are polarized by brushes 63 and 64, electrically connected with the terminals of the generator, the latter being grounded as indicated by the reference character $g'$ in Figure 7, and the former being connected to the conductor 40'. The slip ring 62 of each selector motor is electrically connected with the rotative contact $H^6$, $I^6$ and $L^6$, respectively, on the opposite end of the respective armature shaft.

It is now apparent that the armature of each selector motor will be rotated by the rotation of the operating member 19, for the same angular distance and at the same angular speed that their respective contact segments at the range-finding station are rotated, and consequently, that the rotative contact devices $H^6$, $I^6$ and $L^6$ will be correspondingly rotated, that is to say, the rotative contact $H^6$ will be rotated at the same uniform speed and for the same uniform distances for a given increment of range that the operating device 19 is rotated, while the contact member $I^6$ will be rotated only one-tenth that distance in the same time, and the contact member $L^6$ only 1/100 of that angular distance in the same time. These contact members selectively control the actuating movement of the actuating motor for the indicator at the receiving station, as will now be described.

The three selector step-by-step motors H, I and L are contained within a casing 65 at the receiving station, within which is also contained the actuating or driving motor 66 and the indicator 67, which is shown as of the revolution counter type, and which is driven by the motor 66 through the bevel gears 68 and 69, the former being on the armature shaft and the latter being on the shaft of the indicator. The actuating motor 66 has two oppositely wound field coils 70 and 71 which are connected to the conductor 40' in series with the armature winding, through suitable brushes, as shown in Fig. 7, and the selective contacts $H^6$, $I^6$ and $L^6$ are adapted to have electrical connection with one or the other of the coils 70 and 71, so as to properly selectively control the operation of the actuating motor. Stub shafts $72^h$, $72^i$, $72^l$, are arranged in alinement with the armature shafts of the respective selector motors, and are connected by suitable gearing to be driven at proper speeds by the actuating motor 66, as will be described hereinafter. These stub shafts have two slip rings upon them $73^h$ and $74^h$, $73^i$ and $74^i$, and $73^l$ and $74^l$ respectively, and the slip rings on each stub shaft are electrically connected to two brushes $75^h$ and $76^h$, $75^i$ and $76^i$, and $75^l$ and $76^l$, respectively. The two brushes $75^h$ and $76^h$, etc., of each pair are arranged in the path of the respective rotative contact members $H^6$, $I^6$ and $L^6$ of their respective selector motors, each contact member being of a length slightly less, say 18°, than the distance between the cooperative pair of brushes. The two slip rings on each stub shaft are engaged by two brushes $77^h$ and $78^h$, $77^i$ and $78^i$, $77^l$ and $78^l$, respectively, which brushes are electrically connected with the field coils 70 and 71, respectively, of the actuating motor through line wires 79 and 80. The line wire 79 normally connects the field 70 to brush $77^h$ which circuit passes through relay contacts $79^i$ and $79^l$ controlled by coils $R^2$ and $R^3$ which will be hereinafter referred to. When these coils are unenergized the contact $79^i$ and contact $79^l$ are upon their back contacts and close the circuit to the brush $77^h$. When, however, the coil $R^3$ is energized the contact $79^l$ disconnects the brush $77^h$ from the coil 70 and connects the brush $77^l$. In the same manner, when the coil $R^2$ is energized the contact $79^i$ disconnects both brushes $77^h$ and $77^l$ of the other two transmitters and connects brush 77 to the field 70 of the motor; or in other words, the brush $77^h$ is normally connected to the motor and upon the successive energizations of coils $R^3$ and $R^2$ the brushes $77^l$ and $77^i$ are successively connected to the field coil with the other brushes being simultaneously disconnected. In the same manner the brushes $78^h$, $78^i$ and $78^l$ are connected to the field coil 71 through line wire 80, which line wire is controlled by relay contacts 80¹ and 80¹ controlled by relay coils R¹ and R⁴.

The motor L has two relays R¹ and R² connecting the brushes 77¹ and 78¹, respectively, to the opposite terminals of the generator G through the branch conductor 81¹ which circuit will be hereafter traced. Each of the relays R¹ and R² controls two contact fingers 79¹ and 80¹ in the main circuits 79 and 80, which contact fingers connect the brushes 77¹ and 78¹ with the coils 70 and 71, respectively, of the actuating motor. If either of the relays R¹ or R² is energized therefore, the connection of the actuating motor 66 with the selector motors back of the motor L is broken and the same movement connects the brushes 77¹ and 78¹ into the lines 79 and 80. The motor I has two similar relays R³ and R⁴ connected to the respective brushes 77¹ and 78¹, and connected to the opposite terminal of the generator through the branch circuit 81¹ and 40'. These relays R³ and R⁴ control two contact fingers 79¹ and 80¹ in the lines 79, and 80, respectively, and when raised these contact fingers connect the respective brushes 77¹ and 78¹ into the lines 79 and 80. When the relays of both the receiver motors I and L are de-energized, the contact fingers controlled by both motors in the lines 79 and 80 assume their normal position, as shown in Figure 7, and close the lines 79 and 80 leading to the brushes 77ʰ and 78ʰ of the motor H. This is true because the circuit for the relays R¹, R², R³ and R⁴ are controlled by a circuit which includes the contact L⁶ and contact I⁶. The circuit for the relay R¹ is as follows: from the generator G to line wire 40, line wire 40¹, wire 81¹, relay R¹, brush 78¹, slip ring 74¹, brush 75¹, contact L⁶, wire 100, to slip ring 62 of the receiver motor L, brush 64 to the ground wire g and it will therefore be seen that the relay R¹ is only energized as long as brush 75¹ remains in contact with contact L⁶. The circuit for the relays R², R³, and R⁴ is similar and need not be described.

The brushes 75ʰ and 76ʰ on the stub shaft 72ʰ are rotated by the motor 66 through the pinion 82 on the armature shaft and the gear wheel 83 on the stub shaft 72ʰ. The brushes 75¹ and 76¹ are rotated by the motor 66 at one-tenth of the speed of the corresponding brushes of motor H, through the reducing gearing consisting of the pinion 84 on the stub shaft 72ʰ and the gear wheel 85 on the stub shaft 72¹; and the brushes 75¹ and 76¹ are driven by the motor 66 at one-tenth of the speed of the corresponding brushes of the motor I, through the reducing gearing consisting of the pinion 86 on the stub shaft 72¹ and the gear wheel 87 on the stub shaft 72¹.

The operation of the selector motors will be understood from the following:—Let us assume, by way of illustration, that the parts be so arranged that the low speed contact device which is in control of the motor L makes one complete rotation for an adjustment of the range finder of 20,000 yards; then the intermediate contact device on the shaft 50 will make a complete rotation for every adjustment of 2,000 yards, and the high speed contact device on the operating member 19 will make a complete rotation for every 200 yards. If the operating member 19 be rotated sufficiently far to effect an angular movement of the rotative contact L⁶ for 1/20 of the complete rotation in either direction, it will bring the contact L⁶ in contact with either the brush 75¹ or 76¹. As soon as the rotative contact L⁶ engages the brush, the corresponding field coil 70 or 71, is energized and the motor is caused to rotate in the corresponding direction. This rotation of the motor will rotate the stub shaft 72¹ through the connection previously described and as shown in Figure 4, and this rotation of the stub shaft 72¹ will rotate the brushes 75¹ and 76¹ in the same direction as the rotative contact L⁶ is being rotated, and will tend to rotate the brush which is in engagement with the contact L⁶ off the contact. The motor 66 will therefore continue to rotate and drive the indicator 67 until the brush 75¹ or 76¹ is rotated off the contact L⁶, when the relay R¹ or R², whichever one was energized, will be de-energized, and the contacts 79¹ and 80¹ will be dropped, and if either of the brushes 75¹ or 76¹ are in contact with the rotative contact I⁶ of the motor I, the contact fingers 79¹ and 80¹ will be picked up and the motor 66 will be energized through this connection, and will continue to rotate the stub shaft 72¹ until the brush 75¹ or 76¹ is cleared from the contact I⁶ which will cause the de-energization of either relay R³ or R⁴. The contact fingers 79¹ and 80¹ will then be dropped and the connection of the brushes 77ʰ and 78ʰ to the field coils 70 and 71 of the actuating motor will be completed, and the actuating motor will be energized through either the brush 75ʰ or 76ʰ if the contact H⁶ is in engagement with either one of these brushes, and the motor 66 will continue to rotate until the brush on the stub shaft 72ʰ is cleared of the contact H⁶. Thus, it will be seen that the selector motor L will operate the actuating motor 66 through the increments of range exceeding 1,000 yards, this being 1/20 of the range measured when the contact L⁶ is turned through a complete rotation, and for the same reason the selector motor I will operate the actuating motor 66 through a measurement of range from 100 to 1,000 yards, and the selector motor H will operate the actuating motor through increments of range under 100 yards.

It will further be noted that the action at the receiving station is entirely automatic and self-synchronizing, and that if the operating member 19 is turned so rapidly that the rotative contacts of the selector motors get ahead of the brushes on the stub shafts operated by the actuating motor 66, the actuating motor will nevertheless continue to operate until it has been synchronized with the adjustment of the transmitting station, and any temporary error in reading, due to excessive speed in operating the transmitter or to the temporary failure of electrical power, is immediately corrected automatically upon the resumption of normal speed and power supply.

In operation, the operator looks through the opening 2 and turns the handle 12 until the two partial images formed by the range finder are brought into coincidence, when he pushes the button 88, and if the automatic parts have properly adjusted themselves and the range is correctly indicated at the receiving station, a lamp 89 will be lighted in the casing 65 at the receiving station, through the following circuit: from ground $g$ through the operating member 19, follower 24, spring contact member 24' carried thereby, contact projection 22' on the traveler 22 co-operating with the spring contact 24', traveler 22, rod 23, push button 88, wire 40' including movable contact finger 90, and wire 40 to the other terminal of the generator. The contact finger 90 is controlled by a solenoid 91 in series with the actuating motor 66, and is biased to closed position but is pulled open by the solenoid 91 when the actuating motor is energized. This prevents the circuit through the lamp from being closed until the actuation of the motor 66 is completed and the indicator at the receiving station is synchronized with that of the transmitting station.

It is obvious that various modifications may be made in the construction shown in the drawings and above particularly described, within the principle and scope of my invention.

I claim:

1. In combination with the angle measuring device of a range finder including a movable member whose displacements are out of direct proportion to the corresponding ranges, a range indicating mechanism comprising two rotative spiral-bearing members, one having operative connection with an indicator and the other having operative connection with the said movable member and being movable in direct proportion therewith, actuating means for one of the spiral-bearing members, and transmitting mechanism connecting the two spiral-bearing members and arranged under the joint control of the two spirals, the two spirals being so shaped that the first spiral-bearing member is displaced in direct proportion to the range.

2. In combination with the angle measuring device of a range finder including a movable member whose displacements are out of direct proportion to the corresponding ranges, a range indicating mechanism comprising a rotative drum having a spiral thereon and operatively connected with the movable member, an indicator-controlling rotative member having a spiral thereon, a traveling member arranged to be moved by one of the spirals, and a co-operative follower movable by the other spiral, the two spirals being so formed that the follower moves with the traveling member when the rotating member rotates in direct proportion to the range.

3. In combination with the angle measuring device of a range finder including a movable member whose displacements are out of direct proportion to the corresponding ranges, a range indicating mechanism comprising a drum operatively related to the movable member and arranged to have rotative movement in direct proportion to that of the movable member and having a spiral thereon, an indicator-controlling rotative member having a spiral thereon, a traveling member movable by one of the spirals and a co-operative follower member arranged to be moved by the other spiral, means for manually rotating one of the spiral bearing members, a power device for rotating the other spiral bearing member, and means for operatively connecting the power device when the traveling member, the latter spiral bearing member and the follower member are displaced from predetermined relative positions.

4. In combination with the angle measuring device of a range finder including a movable member whose displacements are out of direct proportion to the corresponding ranges, a range indicating mechanism comprising a drum member operatively related to the movable member and arranged to have rotative movement in direct proportion to that of the movable member and having a spiral thereon, an indicator-controlling rotative member having a spiral thereon and having displacements in direct proportion to the changes of range, manually controlled means for rotating one of the spiral-bearing members, and means operatively connecting the two spiral-bearing members including driving mechanism for the other spiral-bearing members and controlling means for the driving mechanism arranged under the joint control of the two spirals.

5. In combination with the angle measuring device of a range finder including a movable member whose displacements are out of direct proportion to the corresponding ranges, a range-indicating mechanism comprising a drum related to the movable member so as to have rotative movement in direct proportion to the movement of the movable member and having a variable spiral cam thereon, a traveling member engaging the cam and movable linearly as the drum is rotated, the cam on the drum being so formed that the traveling member moves in direct proportion to the range, an indicator-controlling rotative member having a uniform spiral thereon, a follower member engaging therewith and linearly movable thereby as the rotative member is rotated, a power device for rotating the rotative member, and means for operating the power device when the traveling and follower members are displaced from predetermined relative positions.

6. In combination with the angle measuring device of a range finder including a movable member whose displacements are out of direct proportion to the corresponding ranges, a range indicating mechanism comprising a drum related to the movable member so as to have rotative movement in direct proportion to the movement of the movable member and having a variable spiral cam thereon, a traveling member engaging the cam and movable linearly thereby as the drum is rotated, the cam on the drum being so formed that the traveling member is moved in direct proportion to the range, an indicator-controlling rotative member having a uniform spiral thereon, a follower member engaging therewith and linearly movable thereby as the rotative member is rotated, an electric motor operatively connected to the rotative member and having two reversely wound field coils, and means controlled by the follower member for supplying current selectively to the field coils when the traveling and follower members are displaced from predetermined relative positions and thereby operate the motor in the proper direction to move the follower member to the said predetermined relative position.

7. In combination with the angle measuring device of a range finder including a movable member whose displacements are out of direct proportion to the corresponding ranges, a range transmitting system comprising a rotative operating member, rectifying transmitting means between the movable member and the operating member operative to cause a differential movement of the two members, whereby the displacements of the operating member are in direct proportion to the corresponding ranges, an indicating device, actuating means for the indicating device, and means controlled by the rotative operating member for operating the actuating means.

8. In combination with the angle measuring device of a range finder including a movable member whose displacements are out of direct proportion to the changes of range, a range transmitting system comprising a rotative operating member, rectifying transmitting means between the movable member and the operating member operative to cause a differential movement of the two members, whereby the displacements of the operating member are in direct proportion to the corresponding ranges, a step-by-step motor controlled by the operating member, and an indicating device controlled by the step-by-step motor.

9. In combination with the angle measuring device of a range finder including a movable member whose displacements are out of direct proportion to the changes of range, a range transmitting system comprising a rotative operating member, rectifying transmitting means between the movable member and the operating member operative to cause a differential movement of the two members, whereby the displacements of the operating member are in direct proportion to the corresponding ranges, a plurality of step-by-step selector motors, means controlled by the operating member for operating the successive step-by-step motors at progressively higher speed, and an indicating device controlled jointly by the step-by-step motors.

10. In combination with the angle measuring device of a range finder including a movable member whose displacements are out of direct proportion to the corresponding ranges, a range transmitting system comprising a rotative operating member, rectifying transmitting means between the movable member and the operating member operative to cause a differential movement of the two members, whereby the displacements of the operating member are in direct proportion to the corresponding ranges, an indicating device, an electric motor for actuating the indicating device, an electric circuit for the motor, a rotative contact member in the circuit controlled by the rotative operating member, and a cooperative rotative contact member controlled by the motor, whereby the actuative rotation of the motor is proportioned to the rotation of the operating member.

11. In combination with the angle measuring device of a range finder including a movable member whose displacements are out of direct proportion to the corresponding ranges, a range transmitting system comprising a rotative operating member, rectifying transmitting means between the movable member and the operating member operative to cause a differential movement of the two members, whereby the displacements of the operating member are in direct proportion to the corresponding ranges, an indicating device, an electric motor for actuating the indicating device having two reversely wound field coils, an electric circuit for the motor, a rotative contact member in the circuit controlled by the rotative operating member, and two rotative brush members controlled by the motor and co-operative with the contact member, one brush member being connected with each field coil.

12. In combination with the angle measuring device of a range finder including a movable member whose displacements are out of direct proportion to the corresponding ranges, a range transmitting system comprising a rotative operating member, rectifying transmitting means between the movable member and the operating member operative to cause a differential movement of the two members, whereby the displacements of the operating member are in direct proportion to the corresponding ranges, an indicating device, an electric motor for actuating the indicating device, a step-by-step motor controlled by the rotative operating member, an electric circuit for the actuating motor, a rotative contact member in the circuit controlled by the step-by-step motor, and a co-operative rotative contact member controlled by the motor, whereby the actuating motor is rotated proportionately to the step-by-step motor.

13. In combination with the angle measuring device of a range finder including a movable member whose displacements are out of direct proportion to the corresponding ranges, a range transmitting system comprising a rotative operating member, rectifying transmitting means between the movable member and the operating member operative to cause a differential movement of the two members, whereby the displacements of the operating member are in direct proportion to the corresponding ranges, an indicating device, an electric motor for actuating the indicating device having two reversely wound field coils, a step-by-step motor controlled by the rotative operating member, an electric circuit for the actuating motor, a rotative contact member in the circuit controlled by the step-by-step motor, and two rotative brush members controlled by the actuating motor and co-operative with the contact member, one brush member being connected in the circuit with each field coil.

14. A distant control system comprising a rotative operating member, an indicating device, an electric motor for actuating the indicating device, an electric circuit for the motor, a plurality of rotative selective contact members in the circuit, the successive contact members being controlled by the operating member and rotative at progressively higher angular velocity, a corresponding number of co-operative rotative contact members in the circuit, controlled by the motor and connected in multiple to the field of the motor and one co-operating with each of the selective contact members, whereby the motor is operated selectively by each selective contact member in proportion to the unit represented by a complete rotation thereof.

15. A distant control system comprising a rotative operating member, an indicating device, an electric motor for actuating the indicating device having two reversely wound field coils, an electric circuit for the motor, a plurality of rotative selective contact members in the circuit, the successive contact members being controlled by the operating member and rotative at progressively higher angular velocity, a corresponding number of pairs of rotative brushes operated by the motor, one brush of each pair being connected in the circuit with each field coil and each pair of brushes being co-operative with one of the selective contact members, whereby the motor is operated selectively by each selective contact member in proportion to the unit represented by a complete rotation thereof.

16. A distant control system comprising a rotative operating member, an indicating device, an electric motor for actuating the indicating device, a plurality of step-by-step selector motors, means controlled by the operating member for operating the successive step-by-step motors at progressively higher speed, an electric circuit for the actuating motor, a plurality of rotative selective contact members connected in multiple in the circuit, one contact member being operated by each step-by-step motor, a corresponding number of rotative brushes in the circuit operated by the actuating motor and connected in multiple to the field thereof and one brush co-operating with each of the selective contact members, whereby the actuating motor is operated selectively by each selective contact member in proportion to the unit represented by a complete rotation thereof.

17. A distant control system comprising a rotative operating member, an indicating device, an electric motor for actuating the indicating device having two reversely wound field coils, a plurality of step-by-step selector motors, means controlled by the operating member for operating the successive step-by-step motors at progressively higher speeds, an electric circuit for the actuating motor, a plurality of rotative selective contact members connected in multiple in the circuit, one contact member being operated by each step-by-step motor, a corresponding number of pairs of rotative brushes operated by the actuating motor, one brush of each pair being connected in the circuit with each field coil and each pair of brushes being co-operative with one of the selective contact members, whereby the actuating motor is operated selectively by each selective contact member in proportion to the unit represented by a complete rotation thereof.

18. A distant control system comprising a rotative operating member, an indicating device, an electric motor for actuating the indicating device, a plurality of step-by-step selector motors, a corresponding number of pairs of oppositely polarized rotative contact segments, the successive pairs of contact segments being rotated by the operating member at progressively higher speeds, a set of stationary brushes co-operating with each pair of contact segments and one set of brushes being electrically connected with each step-by-step motor, an electric circuit for the actuating motor, a plurality of rotative selective contact members connected in multiple in the circuit, one contact member being operated by each step-by-step motor, a corresponding number of rotative brushes in the circuit operated by the actuating motor and connected in multiple to the field thereof and one brush co-operating with each of the selective contact members, whereby the actuating motor is operated selectively by each selective contact member in proportion to the unit represented by a complete rotation thereof.

19. A distant control system comprising a rotative operating member, an indicating device, an electric motor for actuating the indicating device having two reversely wound field coils, a plurality of step-by-step selector motors, a corresponding number of pairs of oppositely polarized rotative contact segments, the successive pairs of contact segments being rotated by the operating member at progressively higher speeds, a set of stationary brushes co-operating with each pair of contact segments and one set of brushes being electrically connected with each step-by-step motor, an electric circuit for the actuating motor, a corresponding number of pairs of rotative brushes operated by the motor, one brush of each pair being connected in the circuit with each field coil and each pair of brushes being co-operative with one of the selective contact members, whereby the actuating motor is operated selectively by each selective contact member in proportion to the unit represented by a complete rotation thereof.

20. In combination with the angle measuring device of a range finder including a movable member whose displacements are out of direct proportion to the corresponding ranges, a range transmitting system comprising a rotative operating member, rectifying transmitting means between the movable member and the operating member operative to cause a differential movement of the two members, whereby the displacements of the operating member are in direct proportion to the corresponding ranges, an indicating device, an electric motor for actuating the indicating device, an electric circuit for the motor, a rotative contact member in the circuit controlled by the rotative operating member, and a co-operative rotative contact member controlled by the motor, whereby the actuative rotation of the motor is proportioned to the rotation of the operating member.

21. In combination with the angle measuring device of a range finder including a movable member whose displacements are out of direct proportion to the corresponding ranges, a range transmitting system comprising a rotative operating member, rectifying transmitting means between the movable member and the operating member operative to cause a differential movement of the two members, whereby the displacements of the operating member are in direct proportion to the corresponding ranges, an indicating device, an electric motor for actuating the indicating device having two reversely wound field coils, an electric circuit for the motor, a rotative contact member in the circuit controlled by the rotative operating member, and two rotative brush members controlled by the motor and co-operative with the contact member, one brush member being connected with each field coil.

22. In combination with the angle measuring device of a range finder including a movable member whose displacements are out of direct proportion to the corresponding ranges, a range transmitting system comprising a rotative operating member, rectifying transmitting means between the movable member and the operating member operative to cause a differential movement of the two members, whereby the displacements of the operating member are in direct proportion to the corresponding ranges, an electric motor for actuating the indicating device, a plurality of selector motors, means controlled by the operating member for operating the successive selector motors at progressively higher speed, an electric circuit for the actuating motor, a plurality of rotative selective contact members connected in multiple in the circuit, one contact member being operated by each selector motor, a corresponding number of rotative brushes in the circuit operated by the actuating motor and connected in multiple to the field thereof and one brush co-operating with each of the selective contact members, whereby the actuating motor is operated selectively by each selective contact member in proportion to the unit of range represented by a complete rotation thereof.

23. In combination with the angle measuring device of a range finder including a movable member whose displacements are out of direct proportion to the corresponding ranges, a range transmitting system comprising a rotative operating member, rectifying transmitting means between the movable member and the operating member operative to cause a differential movement of the two members, whereby the displacements of the operating member are in direct proportion to the corresponding ranges, an electric motor for actuating the indicating device having two reversely wound field coils, a plurality of step-by-step selector motors, means controlled by the operating member for operating the successive step-by-step motors at progressively higher speeds, an electric circuit for the actuating motor, a plurality of rotative selective contact members connected in multiple in the circuit, one contact member being operated by each step-by-step motor, a corresponding number of pairs of rotative brushes operated by the actuating motor, one brush of each pair being connected in the circuit with each field coil and each pair of brushes being co-operative with one of the selective contact members, whereby the actuating motor is operated selectively by each selective contact member in proportion to the unit of range represented by a complete rotation thereof.

24. In a distant control system, a plurality of transmitters, a receiver motor electrically connected to each of said transmitters, a motor, a plurality of circuits therefor, a contact device associated with each receiver motor, and means controlled by the contact devices for selectively establishing the motor circuits through the contact devices.

25. In a distant control system, a plurality of transmitters, a receiver motor electrically connected to each of said transmitters, a motor, a plurality of circuits therefor, a contact device associated with each receiver motor and actuated jointly thereby and by the motor, and means controlled by the contact devices for selectively establishing the motor circuits through the contact devices.

26. In a distant control system, a plurality of transmitters, a receiver motor electrically connected to each of said transmitters, a motor, a plurality of circuits therefor, a contact device associated with each receiver motor, and relays controlled by the contact devices for selectively establishing the motor circuits through the contact devices.

27. In a distant control system, a plurality of transmitters adapted to be driven at different speeds, a receiver motor connected to each of said transmitters, a motor, a plurality of circuits therefor, a contact device associated with each receiver motor and relays controlled by the contact devices for successively establishing the motor circuits through the contact devices, said relays being arranged to cause the motor circuit controlled by the receiver motor connected to the low speed transmitter to be closed first.

28. In a distant control system, a plurality of transmitters, a receiver motor electrically connected to each of the transmitters and provided with a rotary contact member, a motor, electric circuits for the motor, a plurality of movable contact devices coacting with each contact member and actuated by the motor, a plurality of fixed contact devices coacting with the movable contact devices, and means connected to the fixed contact devices for selectively controlling the motor circuits and connecting them to the fixed contact devices.

29. In a distant control system, a plurality of transmitters, a receiver motor electrically connected to each of the transmitters and provided with a rotary contact member, a motor, electric circuits for the motor, a plurality of movable contact devices coacting with each contact member and actuated by the motor, a plurality of fixed contact devices coacting with the movable contact devices, and relays including armatures in the motor circuits and windings connected to the fixed contact devices for selectively controlling the motor circuits and connecting them to the fixed contact devices in parallel with the windings.

In witness whereof I subscribe my signature in the presence of two witnesses.

HANNIBAL C. FORD.

Witnesses:
VICTOR D. BORST,
MARY G. HART.